April 12, 1949.   R. F. DREIFKE   2,467,015
RETRACTING MECHANISM
Filed Nov. 3, 1944
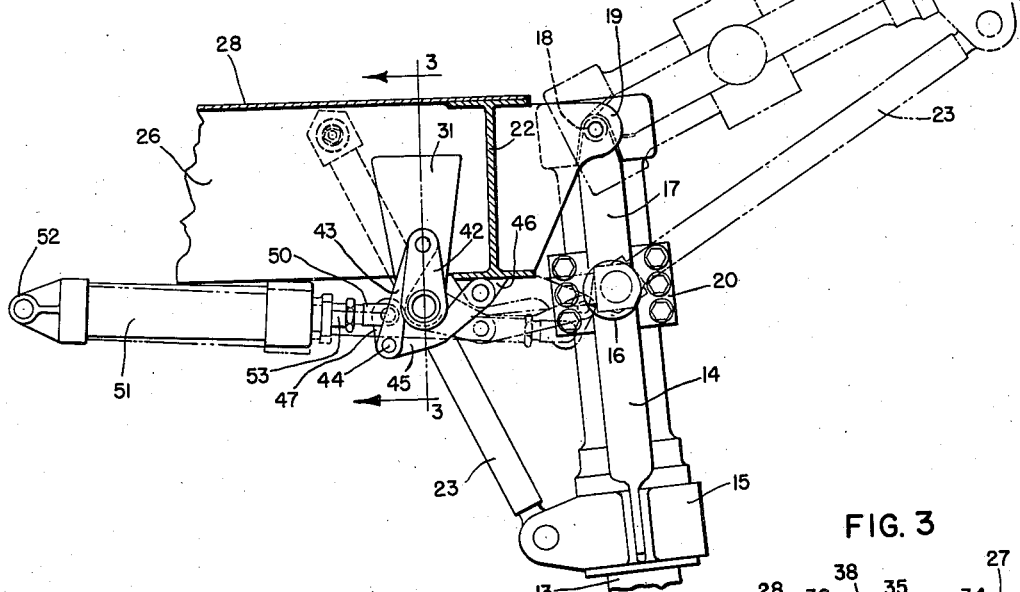
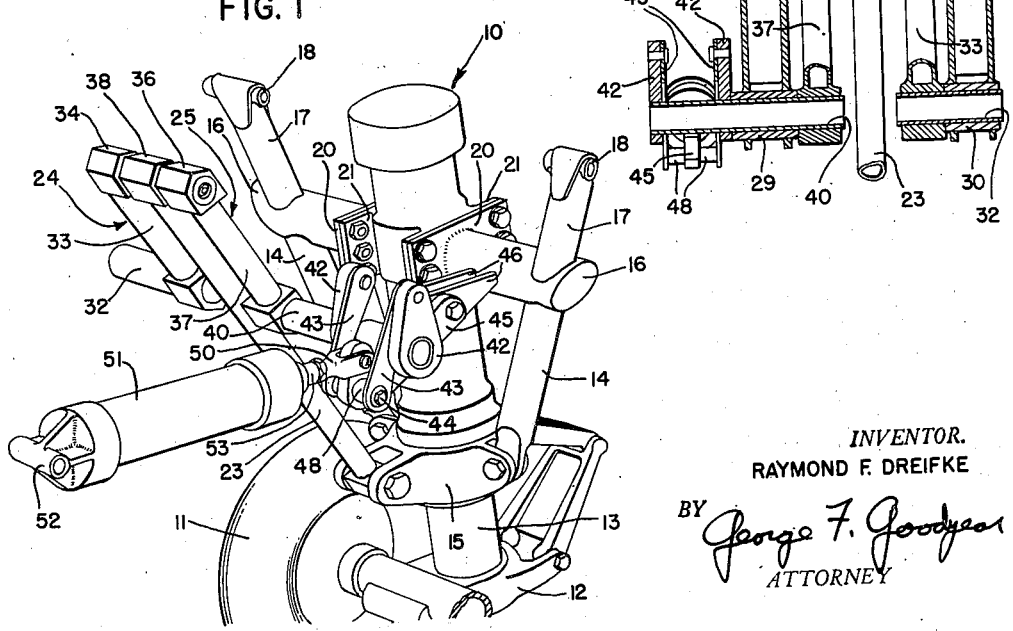
INVENTOR.
RAYMOND F. DREIFKE
BY George F. Goodyear
ATTORNEY Patented Apr. 12, 1949

2,467,015

UNITED STATES PATENT OFFICE 2,467,015

RETRACTING MECHANISM

Raymond F. Dreifke, St. Louis, Mo., assignor to Curtiss-Wright Corporation, a corporation of Delaware Application November 3, 1944, Serial No. 561,791

6 Claims. (Cl. 244—102)

1

The present invention pertains to landing gears for aircraft and is particularly directed to a retractable type of landing gear.

An important object hereof is provide a compact, quick acting and sturdy landing gear mechanism for retractable gears.

A further object resides in an improved retractable landing gear operating mechanism which is capable of folding into a small space, requires a minimum of free space in which to operate and may be actuated between its folded and extended positions rapidly and easily.

It is also an object to provide cooperating crank systems for a movable landing gear in which one crank system supports the gear in its positions of extension and retraction while another crank system is effective to drive the first system, there being mechanical advantage between the crank systems whereby accelerated gear movement is obtained for swinging the same between its extended and retracted positions.

Other objects will be noted in the course of the detailed description of a preferred embodiment of this invention as illustrated in the drawing, in which:

Figure 1 is a perspective view of the landing gear component and actuating mechanism in the extended position, certain structures having been omitted for clarity.

Figure 2 is an elevational view of the gear in its extended full size position and in its retracted dotted line position, and Figure 3 is a partial sectional elevational detail of certain features of the mechanism as seen along the line 3—3 of Figure 2.

The present invention is illustrated in detail in Figure 1 and, as there shown, includes a shock strut 10 which is adapted to carry a dual wheel organization of castering type. The ground engaging wheels, one of which is shown at 11, are mounted on a suitable structure 12 at the lower end of the movable piston member 13 of the shock strut.

The principal support for the shock strut 10 comprises a pair of laterally spaced brace elements 14 each of which is rigidly bolted or otherwise secured to the shock strut by means of a fixed collar 15 carried by the strut. The brace elements 14 are welded to oppositely extending intermediate cross-braces 16. Above these cross-braces 16 are arranged a pair of welded-on braces 17 which carry pivot bearings 18 for the pivotal securement of the landing gear component on spaced lugs 19 carried as a fixed portion of the aircraft. In the present arrangement the rigid

2 cross-brace structure 16 is welded or otherwise secured to flange plates 20 which are adapted to be bolted in assembly to similar boss plates 21 formed on the shock strut as an integral part thereof. In this arrangement the landing gear component which comprises the shock strut 10 and wheel organization 11 is adapted to be movable about the pivot bearings 18 in a fore and aft direction with respect to the longitudinal center line of the aircraft. The pivot bearing lugs 19 are secured to a cross beam 22 which may be a fuselage ring member or the like.

The landing gear is further supported and braced, particularly when in the extended position, by a rearwardly and upwardly extending bracing and retracting member 23. The lower end of member 23 is pivotally secured to the collar 15 as is clearly indicated in Figure 1, while the upper end of this member is carried by a pair of crank members 24 and 25 in a manner later to be described. The aircraft structure (Figure 3) also includes a pair of spaced and longitudinally extending beams 26 and 27 which, with the transverse beam 22, carry the floor members 28 of the aircraft. At the lower margin of the beams 26 and 27 there is provided a pair of bearings 29 and 30 respectively, and each of these bearings is welded to supporting plate members 31 positioned on opposite sides of each beam to extend therebelow as shown. In the present arrangement the bearing 30 is adapted to receive and operatively support a tubular shaft 32 which forms the principal pivot support for the crank 24, the latter consisting of a connecting rod 33 mounted at one end on the tubular shaft 32 and providing at its opposite end a suitable fitting 34 to receive a crank wrist pin 35. This wrist pin extends from the fitting 34 to a second fitting 36 which is carried by the connecting rod 37 of the crank organization 25. The fitting elements 34 and 36 are spaced apart a suitable distance in order to receive therebetween on the wrist pin 35 a fitting 38 secured at the upper end of the bracing and retracting member 23. It will be observed that the bearing 29 carried by the beam member 26 is adapted to receive and support a second tubular shaft 40 which supports at its innermost end the crank connecting rod 37 and at its outer end a gear retracting mechanism later to be described. Turning briefly to Figure 1, it will be seen that the crank organizations 24 and 25 above described in detail are illustrated in their respective positions for retaining the landing gear in its extended position. In this view the beam members 26 and 27 have been omitted in order to clarify the structural arrangement of the several parts thereof.

The gear actuating mechanism herein preferred comprises a pair of crank elements or links 42 which are rigidy secured to the outwardly projecting portion of the shaft 40 carried in bearing 29. These crank links each carry, in a pivotal manner, connecting links 43, each of the links in turn being pivotally secured by means of a pivot pin 44 upon opposite sides of a guide linke 45. The guide link 45 (Figure 2) is pivotally secured on a suitable bracket 46 which is carried by the transverse beam member 22 of the aircraft structure. The guide link 45 extends rearwardly from its principal pivot support 46 and curves upwardly about the tubular shaft 40 where it terminates in an enlarged hook-like portion 47. This enlarged portion provides the bearing for pivot pin 44 and also provides an upper pivot bearing for the attachment of a yoke-type rod end 50 of the gear retracting and extending unit 51. The links 43 are retained in spaced relation upon pin 44 by means of spacer elements 48 so that no interference with yoke 50 will be encountered. In the present arrangement the unit 51 comprises a hydraulic cylinder which is pivotally secured at its rearward end in a bearing boss 52 and at its forward end is supported on the piston rod 53 which extends outwardly and carries thereon the yoke member 50. The structural form of the guide link 45 is clearly illustrated in Figures 1 and 2 of the drawing.

The presently described landing gear is indicated by full line in Figure 2 in its extended and ground engaging position for the support of the aircraft. In this position the bracing and actuating rod 23 is positioned in a lapped and dead center relation with respect to the crank units 24 and 25. Therefore, the longitudinal thrust of the landing gear is transmitted by the bracing member 23 into each of the crank connecting rods 33 and 37 and hence through tubular shafts 32 and 40 to the beams 26 and 27. In this connection it should be noted here that the crank assembly 24 will hereinafter be referred to as an "idler crank" while the crank means 25 will be referred to as "operating crank." In effect, the idler crank is adapted to stabilize and strengthen the connection between brace 23 and the operating crank 25.

When the landing gear is desired to be retracted and moved into the dotted line position of Figure 2, the hydraulic retracting unit is energized and the piston rod 53 is moved outwardly or to the right in this view. The first action which occurs is rotation of the guide link 45 about its pivotal connection on bracket 46. However, since the guide link 45 is also operatively connected by means of elements 43 to the crank links 42 there is produced simultaneously rotation of the tubular shaft 40 upon which the operating crank is mounted. Continued outward extension of the piston rod will carry the guide link 45 to the dotted line position and will also rotate the crank links 42 to the dotted line position as indicated in this figure. The interconnecting links 43 will then assume an intermediate position as indicated. The hydraulic actuating unit has a comparatively short stroke as defined by the length of the guide link 45. However, the rotation of the tubular shaft 40 swings the operating crank 25 and its associated idler crank 24 through a considerably larger arcuate path, the final position of these latter crank members being indicated in the drawing. An advantage of the present system is the compact arrangement for the actuator and foldable crank system including crank links 42, links 43 and guide link 45. With this arrangement the movement of the landing gear strut may be chosen to suit any condition desired as there is embodied in this system a very useful mechanical advantage between the crank system associated with the bracing and actuating member 23 and the foldable crank system. Obviously the two crank systems may have different proportions than that shown without altering the basic principle of this invention.

The landing gear mechanism herein preferred has now been described in detail, but obviously a number of structural modifications and rearrangement of parts may be made without in any way detracting from the merits of this invention. Therefore, such changes should not in any way limit or detract from the scope of this invention as will hereafter be defined in the claims.

What is claimed is:

1. A retractable landing gear for an aircraft structure including a strut pivoted to said structure for movement between retracted and extended positions, a crank shaft journalled upon said structure and having a pair of crank arms, a drag link pivotally connecting one crank arm to said strut, said drag link substantially overlying said crank arm when the strut is extended, a pair of pivotally connected links one of which is pivoted to the other crank arm and the other link of which is pivoted to said structure, said links being substantially collapsed upon said shaft when said strut is extended, and a jack for swinging said other link about its pivot to said structure to thereby angularly move the crank shaft for retracting the strut.

2. A retractable landing gear for an aircraft structure including a strut pivoted to said structure for movement between retracted and extended positions, a crank shaft journalled upon said structure and having a pair of crank arms, a drag link pivotally connecting one crank arm to said strut, said drag link substantially overlying said crank arm when the strut is extended, a pair of pivotally connected links one of which is pivoted to the other crank arm and the other link of which is pivoted to said structure, said links being substantially collapsed upon said shaft when said strut is extended, and means for swinging said other link about its pivot to said structure to thereby angularly move the crank shaft for retracting the strut.

3. In retractable landing gear mechanism, a rock shaft journalled upon aircraft structure and carrying a crank arm, a pair of pivotally connected links, one link of said pair being pivotally connected to said crank arm and the other link having a pivoted connection to said structure, said links substantially embracing the shaft in one limit position of the assembly, and means for swinging said links about said pivoted connection toward and from said limit position.

4. In a retractable landing gear operating mechanism, a crank arm pivoted to aircraft structure and operatively connected to the landing gear, a guide link pivoted to said structure, and link means pivotally connected to said crank arm and said guide link, said guide link and link means being in substantially folded relation about the axis of pivot to the aircraft structure of said crank arm in one limit position of the assembly.

5. In a retractable landing gear operating mechanism, a crank arm pivoted to aircraft structure and operatively connected to the landing gear, a guide link pivoted to said structure, a connecting link having pivoted connection to said guide link and to said crank arm, said links being in substantially folded relation about the axis of the crank arm pivot to said structure in one limit position of the assembly, and actuating means connected to one of said links for swinging the assembly toward and from said limit position.

6. In combination with an aircraft structure, an assembly comprising a shaft journalled upon said structure and provided with a crank arm; a pair of pivotally connected links one of which is pivoted to the crank arm and the other of which has a pivotal connection to said structure; said links being folded about their pivotal connection with each other to a substantially V-formation embracing said shaft, and said one link being in folded relation to the crank arm, in one limit position of the assembly, said crank arm and said one link being in substantially extended relation in the other limit position of the assembly; and an extensible unit pivoted to said structure and to said other link for operating the assembly between said limit positions.

RAYMOND F. DREIFKE.

REFERENCES CITED

The following references are of record in the file of this patent:

UNITED STATES PATENTS

| Number | Name | Date |
|---|---|---|
| 2,222,975 | Brown | Nov. 26, 1940 |
| 2,294,467 | Lemonier | Sept. 1, 1942 |

FOREIGN PATENTS

| Number | Country | Date |
|---|---|---|
| 488,059 | Great Britain | June 30, 1938 |
| 700,136 | Germany | Dec. 13, 1940 |